July 22, 1930.  P. W. DIETMANN  1,770,901
MEANS FOR COLLECTING MATCHES
Filed Dec. 16, 1927  3 Sheets-Sheet 1

Patented July 22, 1930

1,770,901

UNITED STATES PATENT OFFICE

PAUL WILHELM DIETMANN, OF JONKOPING, SWEDEN, ASSIGNOR TO AKTIEBOLAGET SIEFVERT & FARNANDER, OF KALMAR, SWEDEN

MEANS FOR COLLECTING MATCHES

Application filed December 16, 1927, Serial No. 240,527, and in Sweden May 9, 1927.

This invention relates to a new method of collecting the matches in match making machines and to means for carrying this method into effect.

Heretofore, in match making machines it has been the common practice to allow the matches after they had been pushed out of the supporting strips to drop directly into loose collecting boxes to be carried to the desired place while in said boxes. This collecting method suffers from the drawback that the period of time available for effecting the exchange of collecting boxes will be too short, as the exchange must be completed before the space between the pushing device and the sliding match collecting plate is filled, which will require some seconds only.

This invention has for its object to overcome said inconvenience and is characterized, chiefly, in that the matches are pushed out into one or more collecting boxes which will hereinafter be termed main boxes permanently associated with the match making machine to be then transferred from said boxes into usual loose collecting boxes, which are removed and replaced by empty loose boxes while the filling of the main boxes is taking place. The period of time available for effecting the exchange of the loose boxes will in this way be equal to the period of time required for filling the main boxes.

The exchange is effected in such a way that the main boxes when filled are removed from their normal position in the machine and set to a position in which their matches may be transferred to the loose boxes. As soon as the transfer of the matches to the loose boxes is completed the main boxes are returned to their normal position to be again filled. In the interval in which the main boxes have been out of their normal position the matches pushed out have been collected upon a slide-plate which is released to allow the matches to drop into the main boxes immediately following the restoration of the latter to normal. During the restoration and filling of the main boxes the loose boxes are removed and replaced by empty boxes.

A preferred mechanism to carry this method into effect is illustrated in the accompanying drawings.

Figure 1:
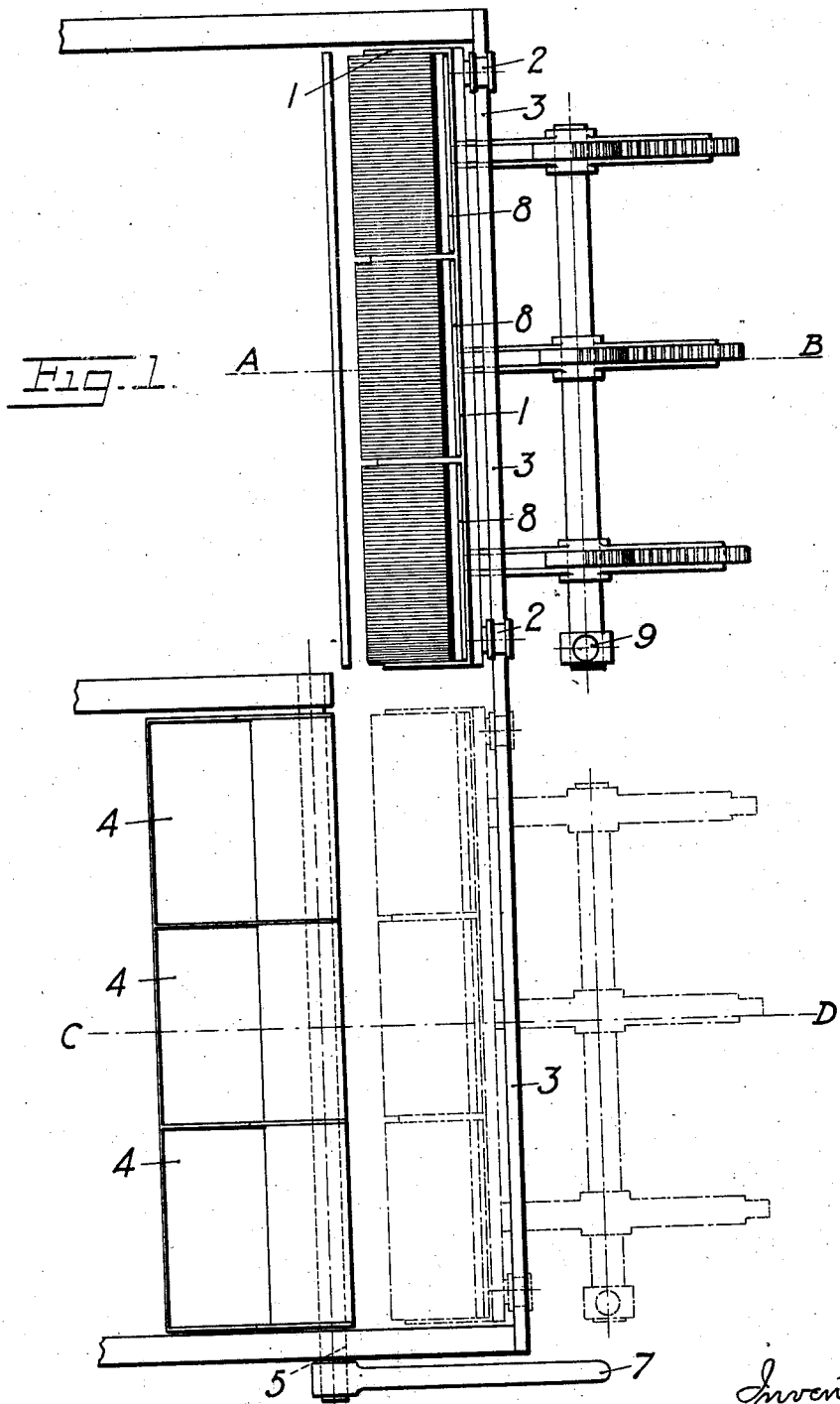
Figure 2:
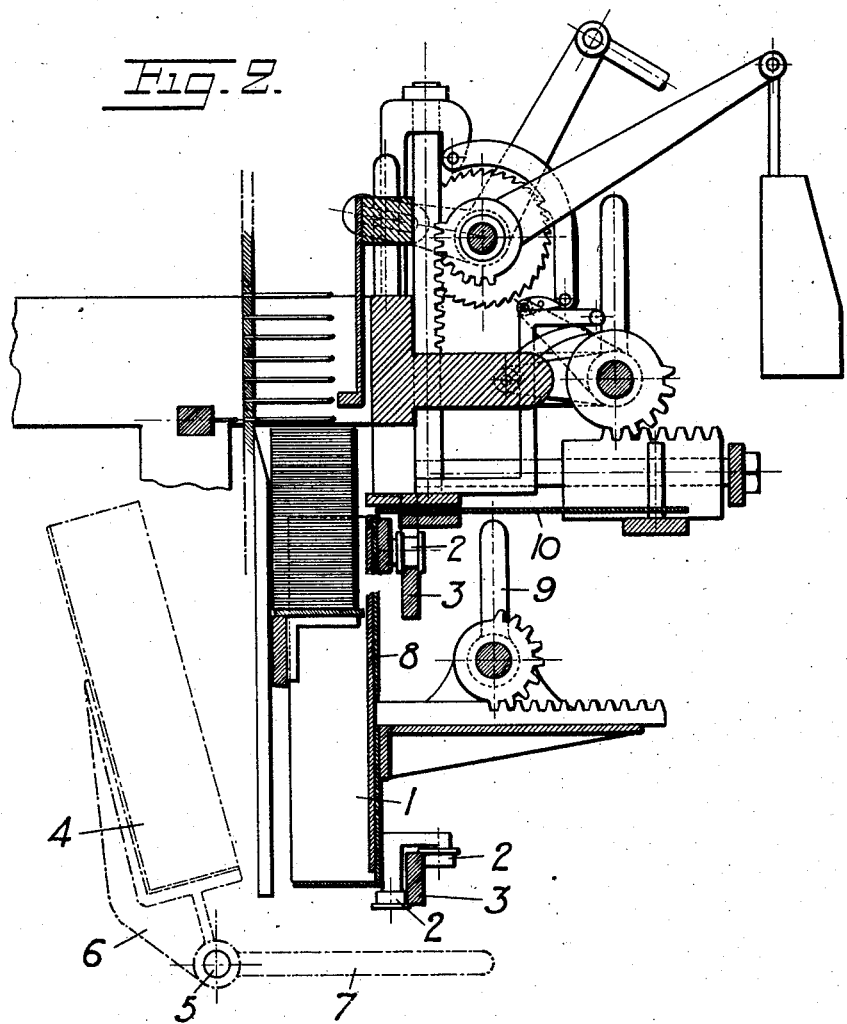
Figure 3:
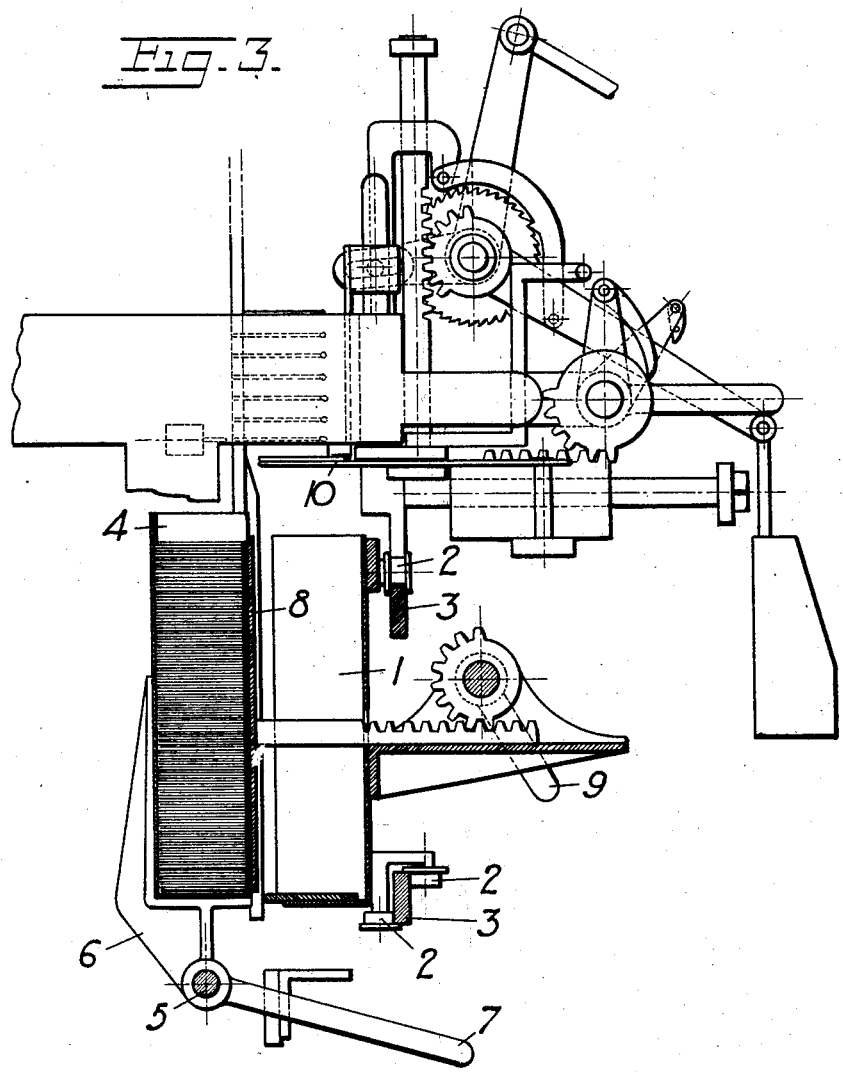

Figure 1 is a plan view of the mechanism.
Fig. 2 is a vertical section on the line A—B of Fig. 1, and
Fig. 3 is a vertical section on the line C—D of Fig. 1.

With reference to the drawings, the numeral 1 designates the main boxes permanently associated with the machine which are shown in Fig. 1 as situated directly below the point where the matches are pushed out of the supporting strips. Said main boxes are supported by a carriage comprising wheels 2 in engagement with rails 3 so as to allow the main boxes to be moved laterally from their normal or filling position in the machine to a position outside of the machine in register with the loose collecting boxes 4. The loose collecting boxes are supported by brackets 6 mounted to rotate on horizontal shafts 5. The main boxes when filled are thus removed from their normal or filling position to a position in front of the empty loose boxes 4, as shown by dotted lines in Fig. 1, the loose boxes being at the same time in the inclined position shown by dotted lines in Fig. 2. The loose boxes are then turned from said inclined position by means of the lever 7 to the vertical position shown in Fig. 3 to receive the matches which are then pushed out of the main boxes by means of the push-plates 8 of said last-mentioned boxes which are operated by the lever 9 through a suitable gearing. The main boxes 1 when emptied are restored to their normal position in the machine to be again filled, while the filled loose boxes are removed to be replaced by empty loose boxes. During the whole period of time in which the main collecting boxes are removed from their normal position and cannot thus receive the matches 11 pushed out the latter are collected upon a sliding plate 10 of well known character.

What I claim is:

1. In a match making machine having supporting strips for the matches, means for collecting the matches pushed out of said supporting strips, said means comprising large collecting boxes arranged to be held stationary in a filling position during the collecting period, and positively controlled means for laterally moving said boxes along a path from said filling position to an emptying position outside of the machine and for removing the boxes in the opposite direction on the same path to said filling position.

2. In a match making machine having supporting strips for matches, means for collecting the matches pushed out of said supporting strips, said means comprising large collecting boxes arranged to be held stationary in a filling position during the collecting period, positively controlled means for laterally moving said boxes along a path from said filling position with the boxes in front of said supporting strips to an emptying position outside of the machine and for removing the boxes in the opposite direction on the same path to said filling position, means situated in register with said emptying position to carry loose boxes, and means for discharging the contents of said collecting boxes into said loose boxes.

3. In a match making machine having supporting strips for the matches, means for collecting the matches pushed out of said supporting strips, said means comprising large collecting boxes held stationary in a filling position during the collecting period and being open at one vertical longitudinal side, a sliding plate in each of said boxes, positively controlled means for laterally moving said boxes along a path from said filling position with the boxes in front of said supporting strips to an emptying position outside of the machine and for removing the boxes in the opposite direction on the same path to said filling position, means situated in register with said emptying position and carrying loose boxes, and means to move said sliding plates to discharge the contents of said collecting boxes into said loose boxes.

In testimony whereof I have signed my name.

PAUL WILHELM DIETMANN.

CERTIFICATE OF CORRECTION.

Patent No. 1,770,901.                                    Granted July 22, 1930, to

PAUL WILHELM DIETMANN.

It is hereby certified that the name of the assignee in the above numbered patent was erroneously described and specified as "Aktiebolaget Siefvert & Farnander, of Kalmar, Sweden", whereas said name should have been described and specified as Aktiebolaget Siefvert & Fornander, of Kalmar, Sweden, as shown by the records of assignments in this office; and that the said Letters Patent should be read with this correction therein that the same may conform to the record of the case in the Patent Office.

Signed and sealed this 9th day of September, A. D. 1930.

M. J. Moore,
Acting Commissioner of Patents.

(Seal)